United States Patent [19]

Kishi et al.

[11] Patent Number: 4,815,555
[45] Date of Patent: Mar. 28, 1989

[54] REAR FENDER ASSEMBLY FOR A MOTORCYCLE

[75] Inventors: Toshiaki Kishi, Tokyo; Miura Tamotsu, Kanagawa, both of Japan

[73] Assignee: Honda Giken Kogyo Kabushiki Kaisha, Tokyo, Japan

[21] Appl. No.: 861,610

[22] Filed: May 9, 1986

[30] Foreign Application Priority Data

May 9, 1985 [JP] Japan .................................. 60-96584

[51] Int. Cl.$^4$ ............................................ B62K 25/04
[52] U.S. Cl. .................... 180/227; 180/219; 280/284; 280/152.1; 280/304.3
[58] Field of Search ........................ 180/219, 225, 227; 280/289 G, 284, 152 R, 152.1, 152.2, 152.3, 289 R, 289 S, 156, 157, 160.1

[56] References Cited

U.S. PATENT DOCUMENTS

Re. 28,335  2/1975  Wood .............................. 280/289 G
2,098,510  11/1937  Morgan ............................. 280/152.2
3,133,748  5/1964  Gunnerson ......................... 280/284

FOREIGN PATENT DOCUMENTS 260474  11/1926  United Kingdom ............... 180/227

Primary Examiner—David M. Mitchell
Assistant Examiner—Donald McGiehan
Attorney, Agent, or Firm—Lyon & Lyon

[57] ABSTRACT

An assembly forming a rear fender and a chain guard for a motorcycle. The rear fender and chain guard are integrally formed and are attached to the rear swing arm suspension of the motorcycle by means of fasteners at several points.

8 Claims, 5 Drawing Sheets

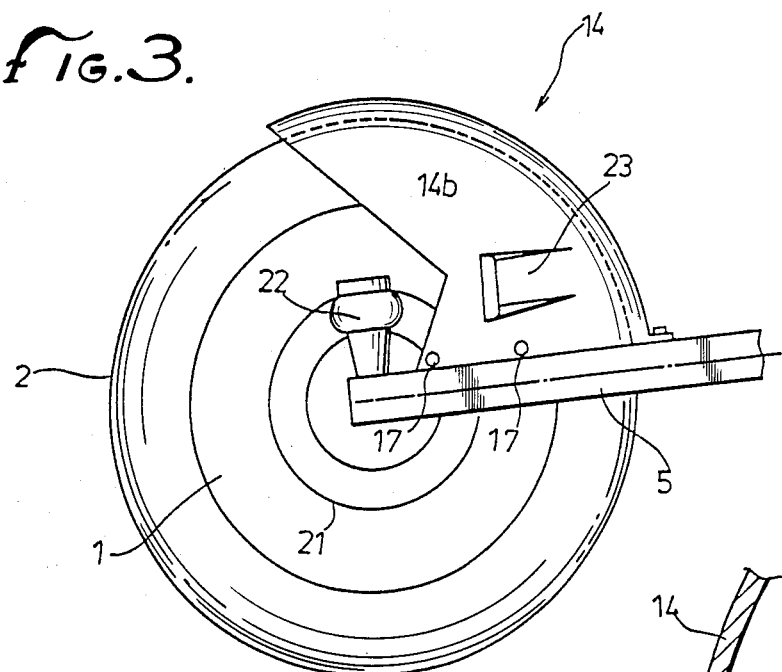
fig.3.
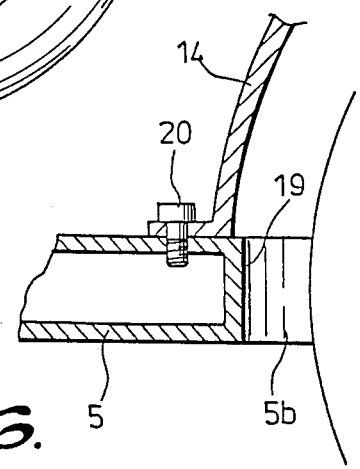
fig.5.
fig.6.
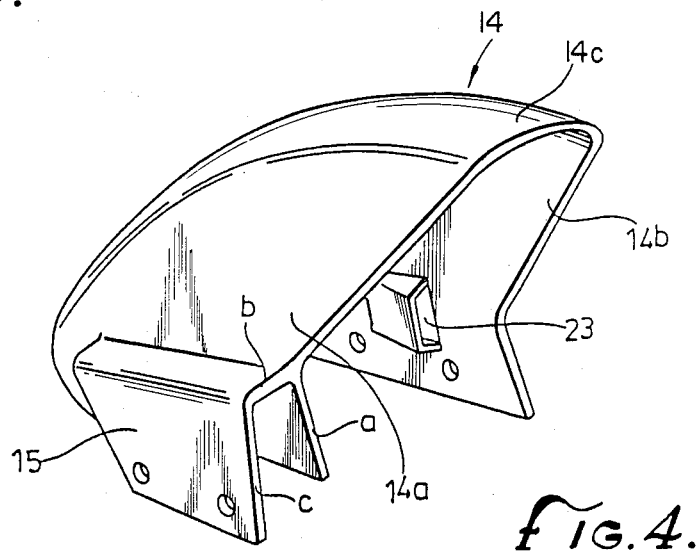
fig.4.

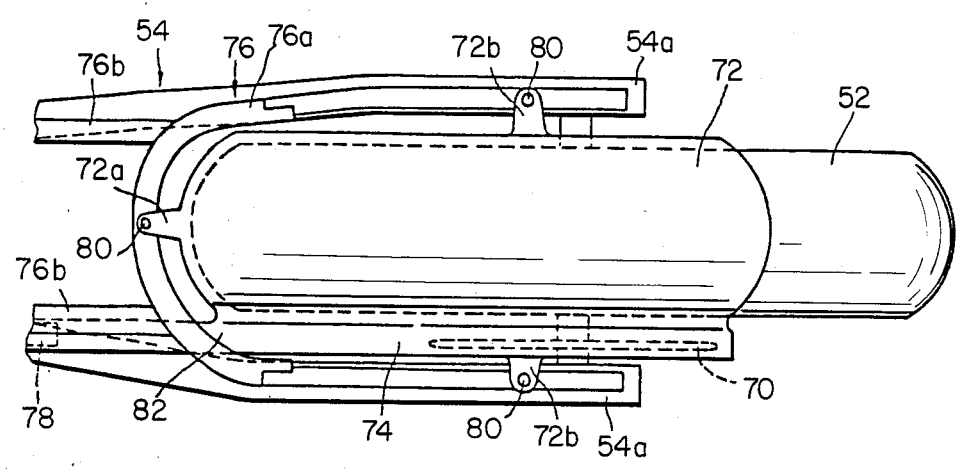
fig.8.
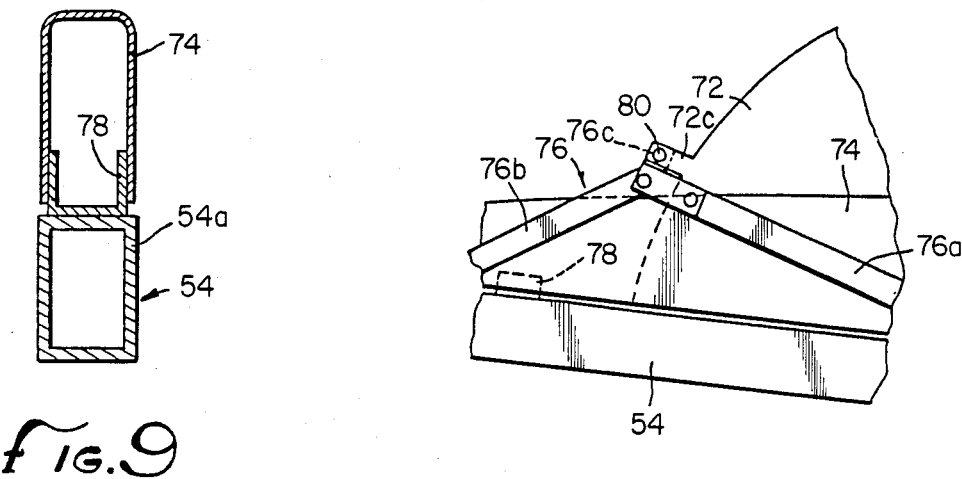
fig.9
fig.10.
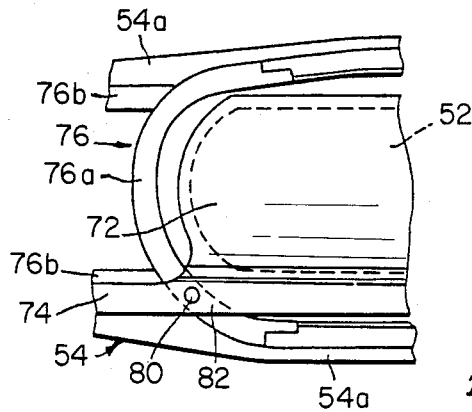
fig.11

REAR FENDER ASSEMBLY FOR A MOTORCYCLE

BACKGROUND OF THE INVENTION

The field of the present invention is motorcycles and shielding members for wheels and drive trains therefor.

In motorcycles, rear fenders are commonly employed for covering an upper part of the rear wheel and tire to prevent the flinging of water, mud and other dirt onto other portions of the motorcycle or the rider. Such fenders are commonly mounted to the body frame such that they do not move with the suspension. Other covers are also employed for other pieces of equipment on such motorcycles. Chain covers for covering the upper portion of a chain drive to the rear wheel have been commonly provided independently of any rear fender.

FIG. 1 illustrates a typical prior art structure employing both a rear fender and a chain guard on a motorcycle. A rear wheel 1 having a tire 2 mounted thereon is mounted to a motorcycle frame 3 by means of a pivot shaft 4 supporting a rear swing arm suspension 5 which is in the form of a rear fork. A rear cushion assembly 6 for damping the suspension movement is coupled with both the frame 3 and rear suspension member 5. An engine 7 is mounted to the frame 3 and provides power output at an output shaft 8. The output shaft 8 is coupled with an axle 9 of the rear wheel by means of a drive chain 10.

A rear fender 01 is located above the rear wheel 1 so as to cover a portion of the outer periphery of the wheel with its associated tire. The portion covered is selected to prevent water, mud and other unwanted material from being delivered from the wheel to the area of the frame 3 or other components. An upper portion 10a of the chain 10 is also shown to be covered by a chain cover 02 which is secured to the rear fork 5.

Also included on the motorcycle is an air cleaner 11 having an air intake port 12. The air cleaner 11 operates to provide clean air to the carburetor 13 for eventual use in the engine 7. The air intake port 12 is located at a position which is isolated from the flinging of material from the tire 2 by the rear fender 01. Thus, the air cleaner and ultimately the engine can run more efficiently without injesting material thrown from the tire. In this typical embodiment, the rear fender and chain cover are provided separately of each other and are mounted independently. Often the fender is mounted to the frame while the chain cover may be mounted directly to the suspension. Accordingly, separate parts, separate means for affixing the parts and a substantial amount of time are required for the assembly of these components on a motorcycle. Such components, time and effort naturally add to the cost and detract from the efficiency of manufacturing.

SUMMARY OF THE INVENTION

The present invention is directed to a rear fender and chain guard assembly intended to provide adequate protection from debris thrown from or entangled with the wheel and drive chain. To this end, a rear fender and chain cover are integrally devised and assembled with the motorcycle.

The integral nature of such an assembly allows for facile assembly with the vehicle, fewer parts and, at the same time, the full protection desired.

BRIEF DESCRIPTION OF THE DRAWINGS

FIG. 3 is a detailed side view of the rear suspension and rear fender assembly of FIG. 2 showing the opposite side thereof.

FIG. 4 is an oblique view of a fender body of the present invention.

FIG. 5 is a cross-sectional detail view taken along line V—V of FIG. 2.

FIG. 6 is a detail cross-sectional view of the attachment of a rear fender body to a rear suspension taken through the center plane of the vehicle.

FIG. 8 is a plan view of the device of FIG. 7 illustrating the rear fender assembly.

FIG. 9 is a cross-sectional view taken along line IX—IX of FIG. 7.

FIG. 10 is a detail side view of yet another embodiment of the present invention.

FIG. 11 is a detail plan view of a further embodiment of the present invention illustrating the forward portion of the fender assembly.

DETAILED DESCRIPTION OF THE PREFERRED EMBODIMENTS

Figure 1:
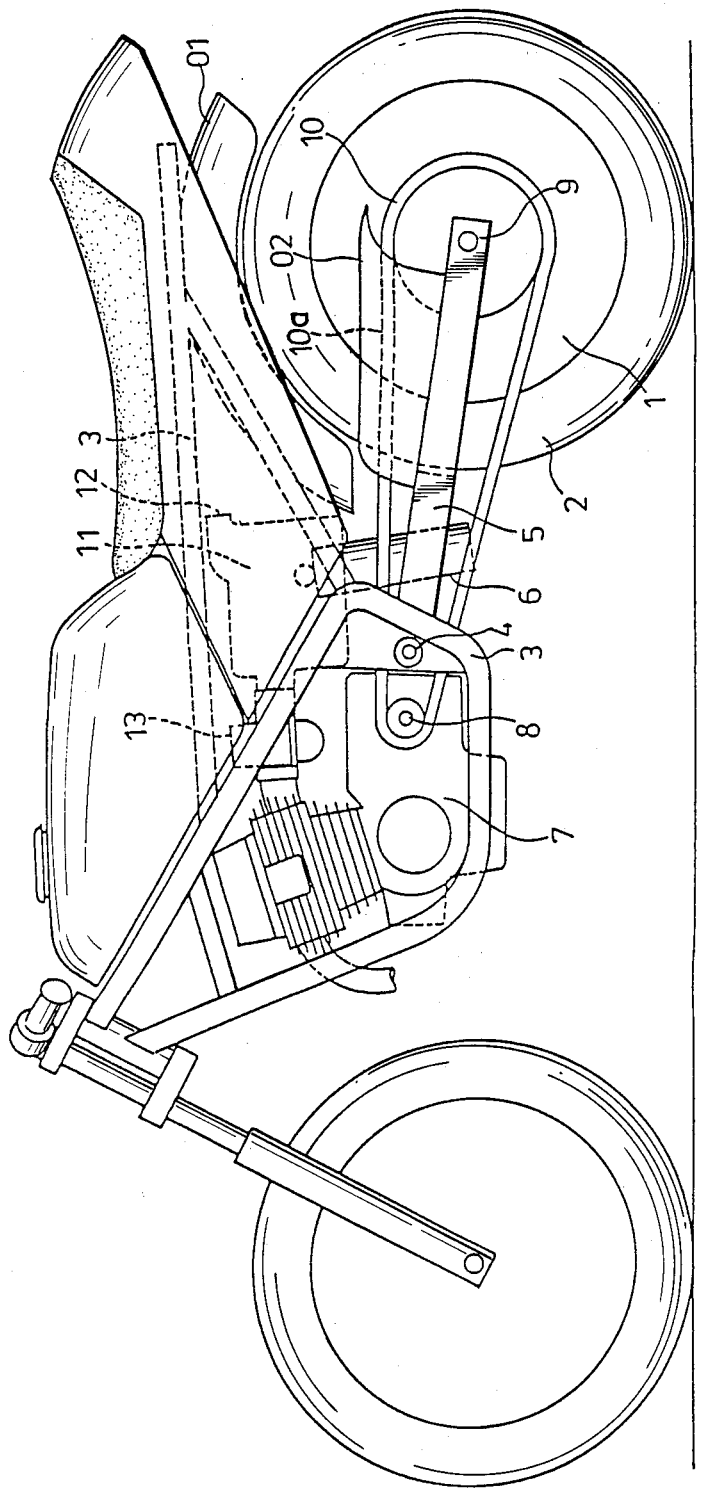
FIG. 1 is a side elevation of a motorcycle of the prior art.
Figure 2:
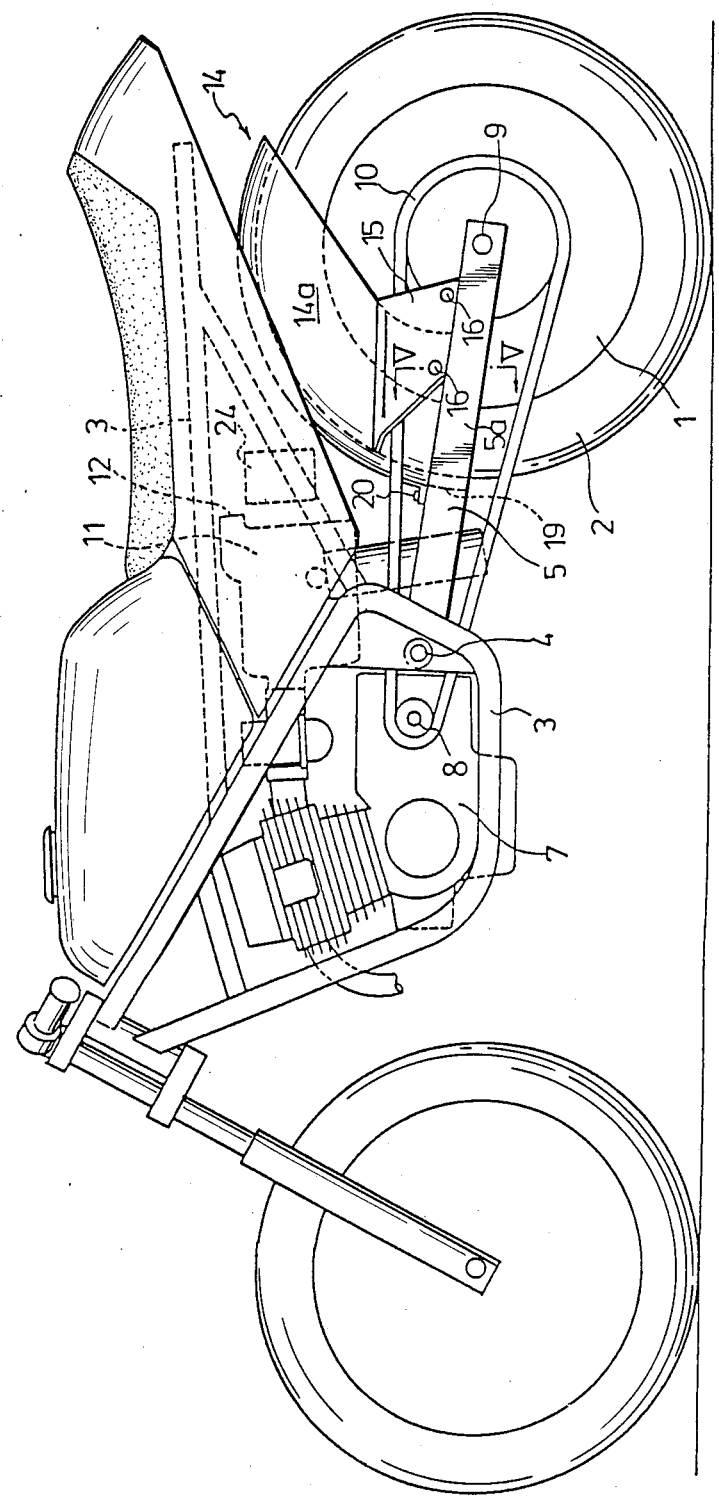
FIG. 2 is a side elevation of a first embodiment of the present invention.

Turning in detail to the drawings, it can be noted that, with the exception of the invention directed to the rear fender assembly, the layout of the motorcycle of FIG. 2 is similar to that of FIG. 1. Consequently, the same reference numerals have been employed where applicable. Missing are the fenders 01 and the chain guard 02. In their place, a rear fender assembly, generally designated 14, is employed. The rear fender assembly 14 is illustrated in the first embodiment in FIGS. 2, 3 and 4. The rear fender assembly 14 is shown to extend partially over the rear wheel 1 and associated tire 2, hereinafter simply referred to as the wheel. In extending over the wheel, the rear fender 14 extends from a position forwardly of the rear wheel up over the top thereof. A portion of the sides of the wheel are also covered. the sidewalls 14a and 14b extend about the sides of the wheel while a perimeter wall 14c extends across the wheel from one sidewall to the other. The sidewalls 14a and 14b and the perimeter wall 14c thus define a rear fender partially covering the rear wheel.

As part of the rear fender assembly, the overall fender body includes a chain guard 15. The chain guard 15 is formed in the shape of a channel and is integral with the rear fender itself. The chain 10 is caused to pass through the channel defined by the chain guard 15. One wall of the channel defining the chain guard 15 forms a part of the wall of the rear fender such that the two cavities thus defined are adjacent yet divided. The channel includes the wall a which is associated with the sidewall 14a of the rear fender, a second sidewall c and a top wall portion b. The embodiment in FIGS. 2, 3 and 4 are shown to be integrally formed and may be of a snythetic resin polymer.

The rear fork 5 of the vehicle extends rearwardly from the pivot shaft 4 and is shown to be forked intermediate its ends at a position forwardly of the rear wheel 1. Thus, a pair of left and right fork portions 5a and 5b of the rear fork extend along opposite sides of the rear wheel to the axle 9.

The rear fender assembly 14 is shown to be affixed by means for attaching the fender body to the rear swing arm suspension 5. The means for attachment are shown in the embodiment of FIGS. 2 thorough 6 to include fasteners 16 and 17 which attach the sidewall c of the chain guard 15 and the sidewall 14b to the rear swing arm suspension 5 thorough holes provided in the sidewalls, respectively. The attachment of the fasteners 16 and 17 is by means of a flange 18 as can be seen in FIG. 5 associated with the rear fork member 5a. A similar flange 18 may be provided on the fork member 5b as well. A fastener 20 is employed at one end of the perimeter wall of the rear fender 14 where it meets with a bracing portion 19 of the rear swing arm suspension 5 as can best be seen in FIG. 6. A flange is provided on the end portion of the rear fender 14 to receive the fastener 20. Thus, the rear fender 14 is mounted on the rear swing arm suspension 5 with five rivets 16, 17 and 20, as shown.

A brake disc 21 is secured to the right sidewall of the rear wheel 1 as shown in FIG. 3. Brake calipers 22 are provided for frictionally engaging the brake disc 21. An air inlet opening 23 is provided through the sidewall 14b forwardly of the calipers 22 so that air may be directed thereto.

The foregoing embodiment admits of several advantages. A relatively small number of fasteners are required for the rigid positioning of the rear fender assembly on the rear swing arm suspension. Thus, fewer components are required and less time is needed for assembly. As can be seen in FIG. 2, the rear fender assembly can be positioned more adjacent the tire than can be done with the fender fixed to the frame. Also, room is provided for the air intake 12 and a battery 24 may be located in the conserved space as well.

Figure 7:
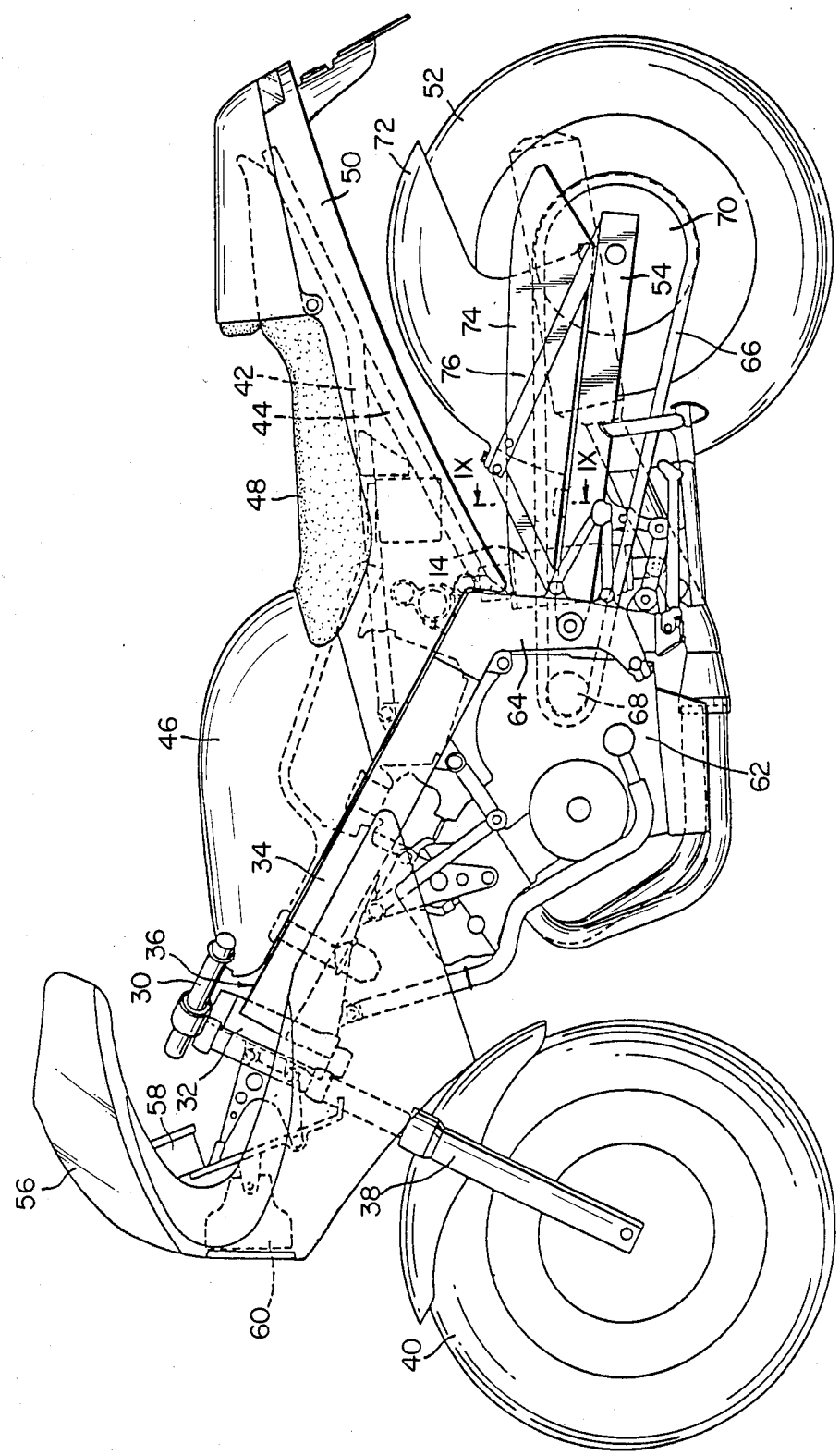
FIG. 7 is a side elevation of a second embodiment of the present invention.

Looking next to the embodiment of FIGS. 7, 8 and 9, an embodiment including a stay associated with the fastening means is disclosed. In FIG. 7, greater detail on the vehicle is also illustrated. The motorcycle includes a handlebar assembly 30 supported for pivotal motion on a head pipe 32. The head pipe 32 is securely mounted on the forward end of a main pipe 34 of a body frame, generally designated 36. The handlebar assembly 30 is coupled with a front fork suspension 38 to mount a front wheel 40.

A seat rail structure 42 supported by a seat rail stay structure 44 is coupled to the main pipe 34. Positioned above the body frame 36 is a fuel tank 46 and a seat 48. Side covers 50 cover the two sides of the vehicle below the seat 48. A rear wheel 52 is located below the side covers 50 by means of a rear swing arm suspension including a rear fork 54.

A partial fairing 56 is disposed at the front portion of the frame 36 to cover an instrument panel 58 and headlight 60, both supported on the heat pipe 30. An engine 62 is carried in the body space between the front wheel 40 and the rear wheel 52. The engine 62 is mounted to the main pipe 34 and a pivot plate 64 which is contiguous with the rear portion of the main pipe 34. A chain drive including a chain 66 extends around a driving sprocket wheel 68 and a driven sprocket wheel 70. The driven sprocket wheel 70 is coupled with the rear wheel 52, both sprockets 68 and 70 being on the left side of the body of the motorcycle.

The upper portion of the rear wheel 52 and a returning stretch of the chain 66 are covered with a rear fender 72 and a chain cover 74, respectively. The rear fender 72 and the chain cover 74 are formed in an integral single body of a synthetic resin material and are securely mounted on an upper face of the rear fork 54 by means of a rear fender stay 76.

The rear fender stay 76 has a U-shaped connecting piece 76a for interconnecting a pair of support arms 54a of the rear fork 54. A pair of stays 76b for supporting the front part of the connecting piece 76a in an inclined position is also incorporated in the rear fender stay 76. Thus, the rear fender stay 76 has a peaked appearance as viewed from the side of the vehicle.

A guide stay 78 is securely mounted on one of the support arms 54a which is located on the left side of the body of the motorcycle. The front part of the chain case 74 is fitted on the guide stay 78. A front part of the rear fender 72 which is formed in an integral relationship with the chain case 74 is fastened to the connecting piece 76a of the rear fender stay 76 by means of a fastening bolt 80. The fastening bolt 80 is coupled with a bracket 72a at the center of the front part of the rear fender 72 located adjacent the forward end 82 of the connecting portion between the rear fender 72 and the chain case 74. The rear part of the rear fender 72 is fastened to opposite sides of the rear part of the connecting piece 76a of the rear fender stay 76 each by means of a fastening bolt 80 associated with a pair of brackets 72b. The brackets 72b are provided on opposite sides of the rear fender 72.

Accordingly, the rear fender 72 and the chain case 74 can be mounted using two mounting screws 80 which connect opposite sides of a rear part of the fender body to the rear fender stay 76. An additional mounting screw 80 connects the rear fender 72 to the rear fender stay 76 adjacent the forward end 82 of the connecting portion between the rear fender 72 and the chain case 74 which is a point of highest strength. The chain case 74 is easily positioned laterally by the guide stay 78. The chain case can be held from vibration thereby. Further, the rear fender stay 76 can be used as a stabilizer for the rear fork 54, and hence the driving performance can be further improved. Consequently, the motorcycle employing this embodiment can be produced advantageously in structure and cost.

FIG. 10 illustates another embodiment of the present invention. In the embodiment of FIG. 8, the fastening bolt 80 located at the front part of the rear fender 72 is oriented vertically. In the embodiment of FIG. 10, brackets 72c and 76c are formed in a vertical direction on the rear fender 72 and a connecting piece 76a of the rear fender stay 76, respectively. In this arrangement, the fastening bolt 80 is oriented in a horizontal direction in each of the brackets 72c and 76c. The fastening bolts 80 thus employed interconnect the rear fender 72 and the rear fender stay 76. Thus, the bolts are more easily reached during assembly, increasing productivity.

FIG. 11 illustrates yet another embodiment of the present invention. In the embodiment of FIG. 11, there is no bracket at the front part of the rear fender 72. Instead, the forward end 82 of the connecting portion between the rear fender 72 and the chain cover 74 is formed with an increased width. The widened forward end 82 of the connecting portion and the connecting piece 76a of the rear fender stay 76 are interconnected by a fastening bolt 80. Accordingly, sufficient mounting strength is assured and access from one side of the body to the fastening means is further improved.

Thus, improved rear fender assemblies are disclosed which are easier to assemble with a vehicle and provide added room for other components. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. For use with a motorcycle including a frame mounting an engine, longitudinally spaced front and rear wheels connected to said frame adjacent the front and rear ends thereof, a drive chain operatively connecting said engine to said rear wheel, a rear swing arm having means at one end for rotatably mounting said rear wheel and a pivot connection to said frame at the other end thereof to permit vertical movement of said rear wheel with respect to said frame, a fender assembly mounted for vertical movement with said rear wheel, comprising: a rigid fender body enclosing at least the upper forward portion of said rear wheel including a perimeter wall substantially concentrically spaced from the periphery of said rear wheel, and oppositely spaced side walls depending from said perimeter wall; a chain guard integrally formed on one of said fender body side walls to enclose the adjacent portion of said drive chain, said chain guard comprising means projecting laterally outwardly from said one fender body side wall to form a channel substantially closed along its top and exterior side, and means for fixing said fender body to said rear swing arm.

2. The organization as recited in claim 1 in which said channel-forming means includes a cover of a substantially inverted V-shaped cross section to form, in cooperation with said rear swing arm suspension, an elongated channel extending parallel to and surrounding said drive chain portion.

3. The rear fender assembly of claim 2 wherein said means for fixing said fender body to said rear swing arm includes a stay fixed at a first point to the rear swing arm suspension and at a second point to said fender body.

4. The organization as recited in claim 1 in which said fender body side walls depend from said peripheral wall, and means for connecting the lower ends of said side walls to said rear swing arm.

5. The organization as recited in claim 1 in which said rear swing arm comprises an elongate body forked intermediate its ends forwardly of said rear wheel to form support members on opposite sides of said rear wheel, and connector means for connecting the opposite sides of said fender body to the respective of said support members.

6. The organization as recited in claim 5 including connector means attaching said perimeter wall to the nexus between said rear swing arm support members.

7. The organization as recited in claim 5 including a stay apparatus interposed between said fender body and said rear swing arm support members, said stay apparatus comprising generally triangularly arranged stay members fixed to said rear swing arm support members and a transvrse connecting piece connecting said stay members substantially at the apices thereof, said connector means attaching opposite sides of said fender body to the respective of said stay members.

8. The organization as recited in claim 7 including connector means attaching said perimeter wall to said transverse piece.

* * * * *